(12) United States Patent
Ishizuka et al.

(10) Patent No.: US 10,837,118 B2
(45) Date of Patent: Nov. 17, 2020

(54) SURFACE TREATED STEEL SHEET FOR FUEL TANK

(71) Applicant: NIPPON STEEL & SUMITOMO METAL CORPORATION, Tokyo (JP)

(72) Inventors: Kiyokazu Ishizuka, Tokyo (JP);
Noriyuki Maekawa, Tokyo (JP);
Hiroaki Uramoto, Tokyo (JP);
Hidetoshi Shindo, Tokyo (JP); Ikuo Kikuchi, Tokyo (JP); Kenichiro Matsumura, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 160 days.

(21) Appl. No.: 15/543,409

(22) PCT Filed: Jan. 20, 2016

(86) PCT No.: PCT/JP2016/051559
§ 371 (c)(1),
(2) Date: Jul. 13, 2017

(87) PCT Pub. No.: WO2016/117595
PCT Pub. Date: Jul. 28, 2016

(65) Prior Publication Data
US 2017/0362732 A1  Dec. 21, 2017

(30) Foreign Application Priority Data
Jan. 21, 2015 (JP) .................. 2015-009535

(51) Int. Cl.
| | | |
|---|---|---|
| B32B 15/04 | (2006.01) | |
| B32B 15/18 | (2006.01) | |
| B32B 15/08 | (2006.01) | |
| C25D 7/00 | (2006.01) | |
| C23C 28/00 | (2006.01) | |
| B60K 15/03 | (2006.01) | |
| B65D 85/84 | (2006.01) | |
| C23C 2/06 | (2006.01) | |
| C23C 2/26 | (2006.01) | |
| C23C 22/44 | (2006.01) | |
| C23C 2/40 | (2006.01) | |
| C23C 22/42 | (2006.01) | |
| C25D 5/48 | (2006.01) | |
| C23C 22/08 | (2006.01) | |
| B32B 1/02 | (2006.01) | |
| C23C 22/06 | (2006.01) | |
| C25D 3/22 | (2006.01) | |
| C25D 3/56 | (2006.01) | |
| B62J 35/00 | (2006.01) | |

(52) U.S. Cl.
CPC ............... *C25D 7/00* (2013.01); *B32B 1/02* (2013.01); *B32B 15/18* (2013.01); *B60K 15/03* (2013.01); *B65D 85/84* (2013.01); *C23C 2/06* (2013.01); *C23C 2/26* (2013.01); *C23C 2/40* (2013.01); *C23C 22/06* (2013.01); *C23C 22/08* (2013.01); *C23C 22/42* (2013.01); *C23C 22/44* (2013.01); *C23C 28/3225* (2013.01); *C23C 28/34* (2013.01); *C25D 3/22* (2013.01); *C25D 3/56* (2013.01); *C25D 5/48* (2013.01); *B60K 2015/03032* (2013.01); *B62J 35/00* (2013.01); *C23C 2222/20* (2013.01)

(58) Field of Classification Search
None
See application file for complete search history.

(56) References Cited

U.S. PATENT DOCUMENTS

| | | | |
|---|---|---|---|
| 5,380,585 | A | 1/1995 | Ogawa et al. |
| 6,143,422 | A | 11/2000 | Nagai et al. |

FOREIGN PATENT DOCUMENTS

| | | | |
|---|---|---|---|
| CN | 102227517 | A | 10/2011 |
| EP | 3231896 | A1 | 10/2017 |
| JP | 5-86353 | A | 4/1993 |
| JP | 5-106058 | A | 4/1993 |
| JP | 9-324279 | A | 12/1997 |
| JP | 9-324280 | A | 12/1997 |
| JP | 2981040 | B2 | 11/1999 |
| JP | 2985768 | B2 | 12/1999 |
| JP | 2004-84499 | A | 3/2004 |
| JP | 2004-169122 | A | 6/2004 |

(Continued)

OTHER PUBLICATIONS

English machine translation of Morishita (WO 2010/061964), EPO, accessed Apr. 19, 2019.*
Chinese Office Action and Search Report, dated Sep. 29, 2018, 2018, for corresponding Chinese Application No. 201680005964.2, with a partial English translation of the Chinese Office Action.
International Search Report for PCT/JP2016/051559 dated Mar. 22, 2016.
Office Action issued in JP 2016-533734 dated Aug. 2, 2016.
Office Action issued in TW 105101892 dated Nov. 28, 2016.

(Continued)

*Primary Examiner* — Xiaobei Wang
(74) *Attorney, Agent, or Firm* — Birch, Stewart, Kolasch & Birch, LLP

(57) ABSTRACT

Provided is a surface treated steel sheet for a fuel tank, the surface treated steel sheet including: a Zn plated layer or a Zn—Ni alloy plated layer which is formed on at least a surface of the steel sheet to be an inner surface of the fuel tank; and a chromate-free chemical conversion coating layer containing a water-and-oil repellent, the chromate-free chemical conversion coating layer being placed over the Zn plated layer or the Zn—Ni alloy plated layer on the surface to be the inner surface of the fuel tank. A water contact angle on a surface of the chromate-free chemical conversion coating layer is more than or equal to 70 degrees and an n-hexadecane contact angle on the surface of the chromate-free chemical conversion coating layer is more than or equal to 30 degrees and less than or equal to 70 degrees.

11 Claims, No Drawings

(56) References Cited

FOREIGN PATENT DOCUMENTS

| JP | 2005-68511 A | 3/2005 |
|---|---|---|
| JP | 2007-186745 A | 7/2007 |
| KR | 10-1999-0036135 A | 5/1999 |
| KR | 10-2011-0083686 A | 7/2011 |
| WO | WO 97/46733 A1 | 12/1997 |
| WO | WO 2008/059890 A1 | 5/2008 |
| WO | WO 2010/061964 A1 | 6/2010 |

OTHER PUBLICATIONS

Written Opinion of the International Searching Authority for PCT/JP2016/051559 (PCT/ISA/237) dated Mar. 22, 2016.
Extended European Search Report for corresponding Application No. 16740202.3, dated Jun. 11, 2018.
Korean Office Action for corresponding Korean Application No. 10-2017-7019163, dated Apr. 6, 2018, with a partial English translation.
Indian Examination Report, dated Feb. 13, 2019, for corresponding Indian Application No. 201717024364, with an English translation.
Brazilian Office Action and Search Report dated Feb. 4, 2020, for Brazilian Application No. 112017015003-4, with partial translation.
Indonesian Office Action, dated Jun. 14, 2019, for Indonesian Application No. P00201704530, along with an English translation.

\* cited by examiner

SURFACE TREATED STEEL SHEET FOR FUEL TANK

TECHNICAL FIELD

The present invention relates to a surface treated steel sheet for a fuel tank.

BACKGROUND ART

With tightening environmental regulation in recent years, market needs for materials that do not contain harmful metals have been increased. For example, in the field of automobiles, the switching from a lead-tin alloy plated steel sheet, which has been a main ingredient of fuel tanks, to a material not containing lead has been promoted. Here, to a unique required performance of the fuel tanks, which is high inner corrosion resistance under the environment in which a fuel is enclosed (hereinafter, referred to as fuel corrosion resistance), many suggestions are given involving using zinc-based plated steel sheets, which achieve steady success as inner and outer sheets of automobiles (for example, see the following Patent Literatures 1 to 3).

CITATION LIST

Patent Literature

| | |
|---|---|
| Patent Literature 1: | JP H5-106058A |
| Patent Literature 2: | JP H9-324279A |
| Patent Literature 3: | JP 2004-169122A |
| Patent Literature 4: | JP 2007-186745A |
| Patent Literature 5: | WO 2010/061964 |
| Patent Literature 6: | WO 2008/059890 |

SUMMARY OF INVENTION

Technical Problem

However, the technologies according to Patent Literatures 1 to 3 each have an assumption that chromate treatment is performed, and therefore are incompatible with the recent market needs for materials that do not contain harmful metals. For this reason, a chromate-free zinc-based plated steel sheet for a fuel tank is disclosed (for example, see Patent Literatures 4 to 6). Compared to the conventional zinc-based plated steel sheet subjected to the chromate treatment, the chromate-free zinc-based plated steel sheet is not sufficient in fuel corrosion resistance under a severer environment (for example, corrosion resistance over a longer time period, and corrosion resistance in the case where damage in the coating film has occurred during processing), and requires improvement.

Patent Literature 4 discloses a chromate-free coating film mainly containing an organic resin. However, when such a chromate-free coating film mainly containing an organic resin is exposed to a fuel environment for a long time period, the organic resin is swelled by the fuel, and adhesion between surfaces of plating decreases. It is assumed that such swelling of the organic resin is a factor in insufficient corrosion resistance.

Patent Literature 5 discloses a galvanized steel sheet having a coating film formed by applying an aqueous treatment agent containing an organosilicon compound and an organofluorine compound to a zinc-based plated steel sheet and drying or baking the resultant. Further, Patent Literature 6 discloses a galvanized steel sheet having a composite coating film containing an organosilicon compound, a fluorocompound, a vanadium compound, and a lubricant. However, those steel sheets are improved in corrosion resistance, but are not imparted with corrosion resistance with respect to deteriorated gasoline.

Accordingly, the present invention aims to provide a surface treated steel sheet for a fuel tank, which exhibits excellent corrosion resistance under an environment in which various fuels are enclosed, the fuels including a fuel containing an organic acid such as deteriorated gasoline and a fuel containing dew condensation water in addition to an organic acid, and which has satisfactory press workability. The present invention also aims to obtain the above characteristics without using lead and chromate treatment.

Solution to Problem

The inventors of the present invention have investigated the improvement in fuel corrosion resistance in a chromate-free zinc-based plated steel sheet, and have found that the fuel corrosion resistance can be remarkably improved by making a zinc-based plated layer to be a Zn plated layer or a Zn—Ni alloy plated layer, and imparting not only water repellency but also oil repellency to a surface of the plated layer. Further, the inventors of the present invention have found that, on the contrary, in the case where the oil repellency is excessively imparted, the fuel corrosion resistance decreases and the press workability also remarkably decreases. As a result of carrying out investigation on the basis of those findings, the inventors of the present invention have found that a steel sheet which is excellent in fuel corrosion resistance and press workability can be obtained by forming a coating film having predetermined water repellency and oil repellency on a surface to be an inner surface of a fuel tank. That is, the gist of the present invention is as follows.

(1)

A surface treated steel sheet for a fuel tank, the surface treated steel sheet including: a Zn plated layer or a Zn—Ni alloy plated layer which is placed on a surface to be an inner surface of the fuel tank, the surface being a base metal, or on the surface to be the inner surface of the fuel tank and a surface to be an outer surface of the fuel tank, the surface being the base metal; and a chromate-free chemical conversion coating layer containing a water-and-oil repellent, the chromate-free chemical conversion coating layer being placed over the Zn plated layer or the Zn—Ni alloy plated layer, wherein a water contact angle on a surface of the chromate-free chemical conversion coating layer is more than or equal to 70 degrees and an n-hexadecane contact angle on the surface of the chromate-free chemical conversion coating layer is more than or equal to 30 degrees and less than or equal to 70 degrees.

(2)

The surface treated steel sheet for a fuel tank according to (1), wherein only the surface to be the inner surface of the fuel tank, the surface being the base metal, is provided with the chromate-free chemical conversion coating layer and one of the Zn plated layer and the Zn—Ni alloy plated layer, and the surface to be the outer surface of the fuel tank, the surface being the base metal, is not provided with the chromate-free chemical conversion coating layer and the one of the Zn plated layer and the Zn—Ni alloy plated layer.

(3)

The surface treated steel sheet for a fuel tank according to (2), wherein a deposition amount of Zn and/or Ni on one surface of the fuel tank, the surface being the base metal, is 0.01 to 0.5 g/m$^2$.

(4)

The surface treated steel sheet for a fuel tank according to any one of (1) to (3), wherein a deposition amount of the Zn plated layer or the Zn—Ni alloy plated layer is 5 to 40 g/m$^2$ per surface.

(5)

The surface treated steel sheet for a fuel tank according to any one of (1) to (4), wherein a Ni content in the Zn—Ni alloy plated layer is 9 to 14 mass % with respect to a total mass of the Zn—Ni alloy plated layer.

(6)

The surface treated steel sheet for a fuel tank according to any one of (1) to (5), wherein a deposition amount of the chromate-free chemical conversion coating layer is 0.1 to 2 g/m$^2$.

(7)

The surface treated steel sheet for a fuel tank according to any one of (1) to (6), wherein the chromate-free chemical conversion coating layer contains, as the water-and-oil repellent, a fluorine-based water-and-oil repellent.

(8)

The surface treated steel sheet for a fuel tank according to any one of (1) to (7), wherein the chromate-free chemical conversion coating layer further contains a polyolefin lubricant.

(9)

The surface treated steel sheet for a fuel tank according to any one of (1) to (7), wherein the chromate-free chemical conversion coating layer is an inorganic coating film, and does not contain an organic resin component other than the water-and-oil repellent.

(10)

The surface treated steel sheet for a fuel tank according to (8), wherein the chromate-free chemical conversion coating layer is an inorganic coating film, and does not contain an organic resin component other than the water-and-oil repellent and the polyolefin lubricant.

Advantageous Effects of Invention

According to the present invention, there can be provided a surface treated steel sheet for a fuel tank, which exhibits excellent corrosion resistance under an environment in which various fuels are enclosed, the fuels including a fuel containing an organic acid such as deteriorated gasoline and a fuel further containing dew condensation water in addition to an organic acid, and which has satisfactory press workability.

DESCRIPTION OF EMBODIMENTS

The present invention relates to a zinc-based steel sheet for a fuel tank, which is excellent in corrosion resistance to various fuels and press workability, is not subjected to lead and chromate treatment, and is environmentally friendly. The present invention also relates to a steel sheet used for an automobile, a motorcycle, industrial machinery, and construction machinery, and in addition, used for a tank in which a fuel is enclosed and a part of the tank.

The steel sheet for a fuel tank according to the present invention includes: a Zn plated layer or a Zn—Ni alloy plated layer (hereinafter, also referred to as plated layer) which is placed on a surface to be an inner surface of the fuel tank, the surface being a base metal (one surface), or on the surface to be the inner surface of the fuel tank and a surface to be an outer surface of the fuel tank (both surfaces); and a chromate-free chemical conversion coating layer (hereinafter, also referred to as chemical conversion coating layer) containing a water-and-oil repellent, the chemical conversion coating layer being placed over the Zn plated layer or the Zn—Ni alloy plated layer. Further, a water contact angle on a surface of the chemical conversion coating layer is more than or equal to 70 degrees, and an n-hexadecane contact angle on the surface of the chemical conversion coating layer is more than or equal to 30 degrees and less than or equal to 70 degrees.

In the steel sheet of the present invention, the surface to be the outer surface of the fuel tank (hereinafter, referred to as outer surface) may have the Zn plated layer or the Zn—Ni alloy plated layer, or does not necessarily have the Zn plated layer or the Zn—Ni alloy plated layer. However, in order to make the weldability of the steel sheet satisfactory, it is preferred that the surface to be the outer surface of the fuel tank do not have the plated layer. Further, for example, in the case where the steel sheet is used as a fuel tank for a motorcycle which places importance on the visual quality of the coating of the outer surface of the fuel tank, it is preferred that the outer surface of the fuel tank do not have the plated layer in order to make the external appearance of the coating satisfactory. On the other hand, in the case where the steel sheet is used for the case where the outer surface of the fuel tank also requires high corrosion resistance, it is preferred that the outer surface of the fuel tank have the plated layer. In the steel sheet according to the present invention, the presence and absence of the plated layer on the outer surface and the inner surface can be controlled in accordance with the use. Note that the chromate-free chemical conversion coating layer is not formed over: the Zn plated layer or the Zn—Ni alloy plated layer on the surface to be the outer surface of the fuel tank; or the steel sheet surface which does not have the Zn plated layer or the Zn—Ni alloy plated layer. The water contact angle and the n-hexadecane contact angle can be measured by a known measurement method using a contact angle meter.

It is necessary that the water contact angle and the n-hexadecane contact angle on the surface of the chromate-free chemical conversion coating layer at the surface to be the inner surface of the fuel tank be more than or equal to 70 degrees, and more than or equal to 30 degrees and less than or equal to 70 degrees, respectively. In the case where the water contact angle is less than 70 degrees, the corrosion resistance with respect to deteriorated gasoline is insufficient. It is preferably more than or equal to 80 degrees. The upper limit of the water contact angle is not particularly defined (which does not exceed 180 degrees theoretically), but the level of the upper limit that can be achieved on the chromate-free chemical conversion coating layer placed over an ordinary Zn plated layer or Zn—Ni alloy plated layer is around 120 degrees. In the case where the water contact angle is large, it is assumed that the corrosion resistance improves, since isolation effects are large owing to dew condensation water in which corrosion factors such as organic matters in the deteriorated gasoline are concentrated. In order to obtain sufficient corrosion resistance with respect to deteriorated gasoline, it is not sufficient only to define the water contact angle to the above range, and it is also necessary to control an oil contact angle.

Further, in the present invention, the n-hexadecane contact angle on the surface of the chromate-free chemical conversion coating layer at the surface to be the inner surface of the fuel tank is more than or equal to 30 degrees and less than or equal to 70 degrees. The n-hexadecane contact angle on the surface of the chromate-free chemical conversion coating layer is more preferably more than or equal to 55 degrees and less than or equal to 70 degrees. Here, n-hexadecane is used as an imitation component of fuel oil. In the case where the n-hexadecane contact angle on the surface of the chemical conversion coating layer is less than 30 degrees, corrosion resistance with respect to deteriorated gasoline is insufficient. The reason therefor is not necessarily clear, but it can be considered that, in the case where the contact angle is small, the deteriorated gasoline erodes the coating film from a point at which a flaw caused by press working or the like occurs. Further, in the case where the n-hexadecane contact angle on the surface of the chemical conversion coating layer exceeds 70 degrees, primary rust resistance of the opposite surface of the steel sheet (the surface to be the outer surface of the fuel tank) remarkably decreases. The reason therefor is that the steel sheet for a fuel tank is generally shipped after: the plated layer and the chemical conversion coating layer are formed in a production line; then rust-resistant oil for the primary rust resistance is applied; and the resultant is wound in a coil shape. To be specific, in the case where the steel sheet is wound in a coil shape, the surface to be the outer surface of the fuel tank (that is, the Zn plated surface or the Zn—Ni alloy plated surface which does not have the chemical conversion coating layer, or the non-plated surface) faces the surface to be the inner surface of the fuel tank (that is, the surface of the chromate-free chemical conversion coating layer having water repellency and oil repellency). Here, in the case where the n-hexadecane contact angle on the surface to be the inner surface of the fuel tank exceeds 70 degrees, the surface of the chemical conversion coating layer excessively repels the rust-resistant oil. Since such an effect influences the surface to be the outer surface of the fuel tank that faces the surface to be the inner surface of the fuel tank in the state of being stacked in the coil shape, under the high-temperature and high-humidity condition, rust occurs from the part that lacks the rust-resistant oil on the surface that faces the surface to be the inner surface of the fuel tank (that is, on the surface to be the outer surface of the fuel tank). This phenomenon is fatal particularly in the case where the surface to be the outer surface of the fuel tank is a non-plated surface.

In addition, the above-mentioned steel sheet having poor primary rust resistance also has a poor coating property in the case where a fuel tank is produced after the steel sheet is kept in the coiled state for a long period of time. In the fuel tank produced using the steel sheet, the inner surface is generally the steel sheet as it is whose surface has been treated, but the outer surface is generally coated. Particularly in a tank for a motorcycle, since the importance is placed on the visual quality of the coating of the surface to be the outer surface of the fuel tank, the coating property of the outer surface is an important characteristic. Here, although no abnormality such as rust that can be visually recognized is found through a primary rust resistance test, there is a case where a slight surface layer oxide film-unevenness may cause coating unevenness. Therefore, the n-hexadecane contact angle on the surface to be the inner surface being less than or equal to 70 degrees can suppress the decrease in the rust resistance and the coating property. In addition, it is more preferred that the surface to be the outer surface be a non-plated surface. This is because, in the case where the Zn plated layer or the Zn—Ni alloy plated layer is provided as the surface to be the outer surface, although the n-hexadecane contact angle on the surface to be the inner surface is more than or equal to 30 degrees, which is within the range of the present invention, and no rust occurs in the primary rust resistance test, a slight zinc oxide film-unevenness is likely to occur and the coating property may decrease.

Further, in the case where the n-hexadecane contact angle exceeds 70 degrees, the corrosion resistance with respect to the deteriorated gasoline may decrease, which is not preferred. This is because, as will be described later, in the case where the n-hexadecane contact angle exceeds 70 degrees, oil-repellency becomes remarkable, so that the press workability lowers, and damage in the coating film and the plating may become severe.

On the other hand, in the steel sheet according to the present invention, since the n-hexadecane contact angle on the surface to be the inner surface of the fuel tank is more than or equal to 30 degrees and less than or equal to 70 degrees, the steel sheet repels oil to a certain extent during the press working, but it does not pose a problem on practical use of the press working. Moreover, in the present invention, in the case where the surface to be the outer surface of the fuel tank is the Zn plated surface or the Zn—Ni alloy plated surface, or the non-plated surface, since those surfaces do not repel the oil, the press workability further improves. In this way, the press workability of the steel sheet according to the present invention can be further enhanced by making the surface to be the inner surface of the fuel tank different from the surface to be the outer surface of the fuel tank.

Here, in the steel sheet according to the present invention, the steel sheet (base metal) used as a base material is not particularly limited, and any steel sheet is usable as long as it is a steel sheet that is generally used as a base material of a zinc-based plated steel sheet.

The Zn plated layer or the Zn—Ni alloy plated layer formed on at least one surface of the steel sheet (base metal) according to the present invention is an alloy plated layer containing at least zinc or an alloy of zinc and nickel. The Zn plated layer or the Zn—Ni alloy plated layer can be formed by a known plating method such as an electroplating method.

The deposition amount of the Zn plated layer or the Zn—Ni alloy plated layer in the steel sheet according to the present invention is preferably 5 to 40 $g/m^2$ per surface. In the case where the deposition amount of the Zn plated layer or the Zn—Ni alloy plated layer per surface is less than 5 $g/m^2$, it is not preferred because the corrosion resistance with respect to deteriorated gasoline is likely to be insufficient. Further, in the case where the deposition amount of the Zn plated layer or the Zn—Ni alloy plated layer per surface exceeds 40 $g/m^2$, it is not preferred because it is disadvantageous in terms of cost.

Moreover, the Ni content in the Zn—Ni alloy plated layer is preferably 9 to 14 mass % with respect to a total mass of the Zn—Ni alloy plated layer. In the case where the Ni content is in this range, the corrosion resistance with respect to deteriorated gasoline in particular becomes satisfactory. Note that the Zn plated layer or the Zn—Ni alloy plated layer may contain a known third component (for example, metal such as Fe, Co, Sn, and Cr), and the underneath the Zn plated layer or the Zn—Ni alloy plated layer may be subjected to known pre-plating (for example, pre-plating of Fe and Ni).

The steel sheet for a fuel tank according to the present invention includes the chromate-free chemical conversion coating layer (hereinafter, also referred to as chemical conversion coating layer) containing a water-and-oil repellent, the chemical conversion coating layer being placed over the Zn plated layer or the Zn—Ni alloy plated layer on the surface to be the inner surface of the fuel tank. The deposition amount of the chromate-free chemical conversion coating layer in the steel sheet according to the present invention is preferably 0.1 to 2 $g/m^2$. In the case where the deposition amount of the chromate-free chemical conversion coating layer is less than 0.1 $g/m^2$, it is not preferred because the corrosion resistance with respect to deteriorated gasoline is likely to be insufficient. In the case where the deposition amount of the chromate-free chemical conversion coating layer exceeds 2 $g/m^2$, it is not preferred because the workability and weldability may deteriorate.

In order to achieve the water contact angle and the n-hexadecane contact angle on the surface to be the inner surface of the fuel tank in the steel sheet according to the present invention, it is necessary that the chromate-free chemical conversion coating layer contain a water-and-oil repellent. In particular, it is preferred that the chromate-free chemical conversion coating layer contain a fluorine-based water-and-oil repellent. Any fluorine-based resin having a C—F bond may be used as the fluorine-based water-and-oil repellent, and examples thereof include polytetrafluoroethylene, tetrafluoroethylene-hexafluoropropylene copolymer, tetrafluoroethylene-perfluoroalkyl vinyl ether copolymer, polychlorotrifluoro ethylene, polyvinylidene fluoride, polyvinyl fluoride, ethylene-tetrafluoroethylene copolymer, ethylene-chlorotrifluoroethylene copolymer, and perfluoroalkyl group-containing polymer. The content of the fluorine-based water-and-oil repellent in the chromate-free chemical conversion coating layer is preferably more than or equal to 0.1 mass % and less than or equal to 10 mass % with respect to the total solid content of the chemical conversion coating layer, and is more preferably more than or equal to 1 mass % and less than or equal to 5 mass % with respect to the total solid content of the chemical conversion coating layer.

Further, the chromate-free chemical conversion coating layer of the steel sheet according to the present invention may further contain a polyolefin lubricant. In such a case, slidability while press working is performed on the steel sheet can be reduced. The content of the polyolefin lubricant in the chromate-free chemical conversion coating layer is preferably more than or equal to 0.1 mass % and less than or equal to 10 mass % with respect to the total solid content of the chemical conversion coating layer, and is more preferably more than or equal to 1 mass % and less than or equal to 5 mass % with respect to the total solid content of the chemical conversion coating layer.

The chromate-free chemical conversion coating layer of the steel sheet according to the present invention may be an organic coating layer or may also be an inorganic coating film layer. However, in the case where higher corrosion resistance with respect to deteriorated gasoline is demanded, it is desired that the chromate-free chemical conversion coating layer do not contain an organic resin component or contain an organic resin component the amount of which is minimized. This is because it is estimated that the organic resin component contained in the chromate-free chemical conversion coating layer lowers the corrosion resistance since the organic resin component is swelled by the fuel. Specific examples of the organic resin component contained in the chromate-free chemical conversion coating layer include an acrylic resin, an olefin resin, a urethane resin, an epoxy resin, and a polyester resin. The content of those organic resin components in the chromate-free chemical conversion coating layer is preferably less than or equal to 50 mass %, more preferably less than or equal to 30 mass %, and most preferably 0 mass % with respect to the total solid content of the chemical conversion coating layer.

Moreover, the chromate-free chemical conversion coating layer of the steel sheet according to the present invention may contain, as an inorganic component, a silane coupling agent, a condensation polymer of a silane coupling agent, silica, silicate, phosphoric acid, and phosphate. The chromate-free chemical conversion coating layer of the steel sheet according to the present invention may be formed by containing one of those components or two or more of those components in combination, or by being mixed with the above-mentioned organic resin components. Note that, the chromate-free chemical conversion coating layer may be blended with other components including the above-mentioned polyolefin lubricant, in a range that does not deteriorate the characteristics.

Note that the chromate-free chemical conversion coating film of the steel sheet according to the present invention can be formed through a known method. For example, the method involves preparing application liquid containing predetermined component(s) described above, applying the prepared application liquid over the Zn plated layer or the Zn—Ni alloy plated layer through a known method such as bar coater and roll coater, and then heating at predetermined heating temperature and drying the applied film.

As described above, in order to make the weldability of the steel sheet satisfactory, or, in order to make the external appearance of the coating of the surface to be the outer surface of the fuel tank satisfactory, it is preferred that the surface to be the outer surface of the fuel tank do not have the plated layer. In order to make the outer surface into a state that does not have the plated layer, there can be employed a method not involving applying electric current to the side of the non-plated surface during electroplating. Alternatively, there can be employed a method involving performing plating, and then removing the plating on the side of the non-plated surface through an electrochemical method (for example, anode electrolytic treatment) or a mechanical method (for example, grinding with a brush). Further, the above-mentioned methods can be used in combination.

Owing to the above methods, the non-plated surface (outer surface of the fuel tank) of the steel sheet according to the present invention can be completely prevented from having Zn and/or Ni being deposited thereon. In that case, the deposition amount of Zn and/or Ni is 0. As described above, this is for improving the weldability and the coating property of the steel sheet. It is desirable that the deposition amount be 0.01 to 0.5 $g/m^2$, preferably 0.01 to 0.3 $g/m^2$, more preferably 0.01 to 0.1 $g/m^2$.

The contact angle on the non-plated surface (outer surface) formed through those methods is preferably less than 10 degrees and more preferably less than 5 degrees in the n-hexadecane contact angle. In this way, the press workability and the coating property are improved. In order to ensure the above contact angle, it is effective to suppress oxidation on the surface of the steel sheet, and in this point, it is desirable that a trace amount of Zn and/or Ni is present also on the non-plated surface side. The deposition amount is desirably 0.01 to 0.5 $g/m^2$.

EXAMPLES

Next, the present invention will be described further specifically with reference to Examples and Comparative Examples.

First, using a non-plated steel sheet, one-surface plated steel sheets, and both-surfaces plated steel sheets shown in Table 1 as original sheets, surface treated steel sheets for a fuel tank were produced. Note that the steel sheets shown in Table 1 were each a Ti-added extra-low carbon steel sheet for deep drawing having a thickness of 0.8 mm, and each chemical conversion coating layer was formed only on one surface (the surface to be the inner surface of the fuel tank) of the original sheet or on both surfaces of the original sheet. Note that the compositions of the base coating films that constitute the respective chemical conversion coating layers are shown in Table 2. Further, to the base coating films shown in Table 2, polyolefin lubricants shown in Table 3 and fluorine-based water-and-oil repellents shown in Table 4 were each added in a proportion shown in Table 5, and the chemical conversion coating layers were formed.

TABLE 1

| Symbol | Content |
|---|---|
| S/S | non-plated steel sheet |
| S/5 | Zn—Ni alloy plating (coating weight: 5 g/m$^2$, Ni: 12.5%) on only one surface (surface to be inner surface) |
| S/15 | Zn—Ni alloy plating (coating weight: 15 g/m$^2$, Ni: 11%) on only one surface (surface to be inner surface) |
| S/20 | Zn—Ni alloy plating (coating weight: 20 g/m$^2$, Ni: 10.5%) on only one surface (surface to be inner surface) |
| S/30 | Zn—Ni alloy plating (coating weight: 30 g/m$^2$, Ni: 10.6%) on only one surface (surface to be inner surface) |
| S/40 | Zn—Ni alloy plating (coating weight: 40 g/m$^2$, Ni: 10.1%) on only one surface (surface to be inner surface) |
| 20/20 | Zn—Ni alloy plating (coating weight: 20 g/m$^2$, Ni: 10.5%) on both surfaces |
| S/EG40 | Zn plating (coating weight: 40 g/m$^2$) on only one surface (surface to be inner surface) |
| EG | Zn plated steel sheet (coating weight: 30 g/m$^2$) on both surfaces |

Note that, in Table 2, "urethane resin (*1)" represents an ester-based urethane resin, "ionomer resin (*2)" represents a Na neutralized ionomer resin, "silane coupling agent (*3)" represents 3-glycidoxypropyl trimethoxy silane, "silane coupling agent oligomer (*4)" represents a condensation polymer of 3-glycidoxypropyl trimethoxy silane and 3-aminopropyltriethoxysilane in a ratio of 1:1 (molecular weight of approximately 3000), and "phosphonic acid (*5)" represents 1-hydroxy-ethylidene-1,1'-diphosphonic acid. Further, "—" in Table 2 shows that no corresponding component is blended.

TABLE 3

| Symbol | Content |
|---|---|
| PE | Polyethylene wax |
| PP | Polypropylene wax |

TABLE 4

| Symbol | Content |
|---|---|
| F1 | Polytetrafluoroethylene |
| F2 | Tetrafluoroethylene - hexafluoropropylene copolymer |
| F3 | Tetrafluoroethylene - perfluoroalkyl vinyl ether copolymer |
| F4 | Perfluoroalkyl vinyl ether - methacrylate copolymer |

TABLE 5

| Coating film No. | Base coating film | Polyolefin lubricant PE | Polyolefin lubricant PP | Fluorine-based water-and-oil repellent F1 | F2 | F3 | F4 |
|---|---|---|---|---|---|---|---|
| A1 | a | 1 | — | — | — | — | — |
| A2 | a | 5 | — | — | — | — | — |
| A3 | a | 10 | — | — | — | — | — |
| A4 | a | — | 5 | — | — | — | 5 |
| B1 | b | 5 | — | — | — | — | — |
| B2 | b | — | — | — | — | — | 5 |
| B3 | b | 5 | — | 5 | — | — | — |
| B4 | b | 5 | — | 5 | — | — | 3 |

TABLE 2

| | | Composition of base coating film (solid content, mass %) | | | | | | | | |
|---|---|---|---|---|---|---|---|---|---|---|
| | | a | b | c | d | e | f | g | h | i |
| Organic resin | Urethane resin (*1) | 75 | — | — | — | — | — | 50 | 30 | 10 |
| | Ionomer resin (*2) | — | 60 | — | — | — | — | — | — | — |
| Other than organic resin | Silica | 20 | 30 | — | 10 | — | 20 | — | — | — |
| | Silane coupling agent (*3) | 2 | 8 | — | 9 | — | 2 | — | — | — |
| | Silane coupling agent oligomer (*4) | — | — | 89 | — | — | — | 44.5 | 62.3 | 80.1 |
| | Lithium silicate | — | — | — | 75 | — | — | — | — | — |
| | Phosphoric acid | — | — | 5 | — | — | — | 2.5 | 3.5 | 4.5 |
| | Aluminum primary phosphate | — | — | — | — | 55 | — | — | — | — |
| | Magnesium primary phosphate | — | — | — | — | — | 40 | — | — | — |
| | Ammonium phosphate | 1 | 2 | — | 1 | — | — | — | — | — |
| | Phosphoric acid (*5) | — | — | — | — | 30 | 30 | — | — | — |
| | Vanadyl acetylacetonate | 2 | — | 3 | 2 | — | — | 1.5 | 2.1 | 2.7 |
| | Ammonium vanadate | — | — | — | — | 5 | 4 | — | — | — |
| | Ammonium hexafluorotitanate | — | — | 1 | 1 | 5 | 4 | 0.5 | 0.7 | 0.9 |
| | Tetra-n-butoxy titanate | — | — | — | — | 5 | — | — | — | — |
| | Zirconium oxycarbonate | — | — | 2 | 2 | — | — | 1 | 1.4 | 1.8 |
| Total | | 100 | 100 | 100 | 100 | 100 | 100 | 100 | 100 | 100 |

TABLE 5-continued

| | Base coating | Mass ratio (solid content) with respect to solid content 100 of base coating film | | | | | |
|---|---|---|---|---|---|---|---|
| | | Polyolefin lubricant | | Fluorine-based water-and-oil repellent | | | |
| Coating film No. | film | PE | PP | F1 | F2 | F3 | F4 |
| C1 | c | 5 | — | — | — | — | — |
| C2 | c | — | — | — | — | — | 0.1 |
| C3 | c | — | — | — | — | — | 0.5 |
| C4 | c | — | — | — | — | — | 1 |
| C5 | c | — | — | — | — | — | 5 |
| C6 | c | — | — | — | — | — | 10 |
| C7 | c | — | — | 5 | — | — | 10 |
| C8 | c | 3 | — | — | — | — | 5 |
| D1 | d | — | — | 2 | — | — | — |
| D2 | d | — | — | — | 3 | — | — |
| D3 | d | — | — | — | — | 3 | — |
| E1 | e | — | — | — | — | — | 3 |
| E2 | e | — | 2 | — | — | — | 3 |
| E3 | e | 2 | — | — | — | — | 3 |
| F1 | f | — | — | — | 3 | — | — |
| F2 | f | — | — | — | — | 3 | — |
| G1 | g | — | — | — | — | — | 5 |
| H1 | h | — | — | — | — | — | 5 |
| I1 | I | — | — | — | — | — | 5 |

Note that "-" in Table 5 shows that no corresponding component is blended.

Subsequently, Tables 6 to 8 each show sample preparation conditions, and performance evaluation results of the prepared steel sheets. Here, the contact angle of the surface to be the inner surface of the fuel tank was measured as follows.

(Water Contact Angle)

A contact angle meter (DM-901 manufactured by Kyowa Interface Science Co., Ltd) was used, 3 μl of ion exchanged water were dripped under 25° C. atmosphere, and a static contact angle after 60 seconds was measured.

(n-hexadecane Contact Angle)

A contact angle meter (DM-901 manufactured by Kyowa Interface Science Co., Ltd) was used, 3 μl of n-hexadecane were dripped under 25° C. atmosphere, and a static contact angle after 60 seconds was measured.

Performance evaluation was carried out as follows.

(Primary Rust Resistance)

To the prepared sample, rust-resistant oil (NOX-RUST 530, manufactured by Parker Industries, Inc.) was applied extremely slightly (approximately 0.1 g/m$^2$), and then the resultant was packed in a manner that the surface to be the inner surface and the surface to be the outer surface came into contact with each other so that the state looked like a coil. After stored in 50° C. 98% RH environment for one month, the resultant was unpacked, and a rust state on the surface to be an outer surface of a fuel tank was observed. Note that the observation results were evaluated using the following criteria.

Satisfactory: no rust or discoloration
Unsatisfactory: occurrence of white rust or discoloration
Poor: occurrence of red rust (Coating Property)

The coating property of the surface to be the outer surface was evaluated. Since the outer surface of the fuel tank for an automobile or a motorcycle is normally coated after being subjected to chemical conversion treatment for pre-coating treatment, the external appearance of the coating is dominated by an external appearance after being subjected to the chemical conversion treatment for pre-coating treatment. Accordingly, a steel sheet after being subjected to the chemical conversion treatment for pre-coating treatment was evaluated for the external appearance of the surface to be the outer surface. Note that the chemical conversion treatment for pre-coating treatment was carried out as follows.

A chemical conversion coating layer was formed through P-free chemical conversion treatment (Example 1 in JP 5274560B) consisting of hexafluorozirconic acid, aluminum nitrate, and polyethyleneimine. After that, the steel sheet over which the chemical conversion coating layer had been formed was evaluated by visual observation (however, in the case where it was difficult to perform evaluation by visual observation, the observation was performed using a scanning electron microscope (SEM)), and the evaluation was performed using the following criteria.

Excellent: uniform external appearance
Satisfactory: slight unevenness of an acceptable level
Unsatisfactory: remarkable unevenness
Poor: occurrence of lack of hiding (no chemical conversion coating layer)

(Coating Property After Storage)

A sample stored for one month was used in the same manner as the above-mentioned evaluation of primary rust resistance, the same chemical conversion treatment for pre-coating treatment as the above-mentioned evaluation of coating property was performed, and the evaluation was performed using the same criteria.

(Workability (Slidability))

Evaluation was performed by a draw bead test. Using a die having a convex bead end of 5R and a concave shoulder of 3R, a sample (to which rust-resistant oil (NOX-RUST 530, manufactured by Parker Industries, Inc.) was applied) which was cut to a width of 30 mm was drawn out 100 mm at a rate of 200 mm/min in a range of 500 kg to 1200 kg in terms of press bonding load. After that, a coefficient of friction was determined using the relationship between the press bonding load and a drawing load. Note that the surface to be the inner surface of the fuel tank was set on the convex bead side. Further, no oil was applied to the bead die, and the test was performed by wiping off the oil on the die for every test. The coefficient of friction was evaluated using the following criteria.

Excellent: coefficient of friction≤0.13
Satisfactory: 0.13<coefficient of friction≤0.15
Unsatisfactory: 0.15<coefficient of friction<0.2
Poor: 0.2≤coefficient of friction (Deteriorated Gasoline-Corrosion Resistance)

A steel sheet was molded in a cylinder shape having an inside diameter of 50 mm and a depth of 35 mm, which imitates a fuel tank. After removing oil through grease removing treatment, a flaw that reaches up to the base metal was made by a cutter on the inner surface base (which imitates a flaw caused by press working). After that, test liquid that imitates the deteriorated gasoline (gasoline containing 100 ppm of formic acid, 300 ppm of acetic acid, 100 ppm of chloride ions, 1.0 vol % of water) was enclosed in the molded steel sheet, and was retained at 40° C. for two months. After that, the corrosion state of the steel sheet was evaluated using the following criteria.

Excellent: no corrosion
Satisfactory: slight rust (at a level that no thickness reduction occurred due to corrosion)
Unsatisfactory: partially corroded
Poor: corrosion over entire surface

TABLE 6

| | Original sheet | Coating film No | Coating film formed surface | Amount of coating film [g/m²] | Contact angle on inner surface | | Performance | | | | |
|---|---|---|---|---|---|---|---|---|---|---|---|
| | | | | | Water | n-hexadecane | Primary rust resistance | Coating property | Coating property after storage | Workability | Corrosion resistance |
| Example 1 | S/20 | A4 | Inner surface only | 0.6 | 90 | 69 | Satisfactory | Excellent | Excellent | Excellent | Satisfactory |
| Example 2 | S/20 | B2 | Inner surface only | 0.6 | 99 | 70 | Satisfactory | Excellent | Excellent | Satisfactory | Satisfactory |
| Example 3 | S/20 | C3 | Inner surface only | 0.6 | 70 | 30 | Satisfactory | Excellent | Excellent | Satisfactory | Satisfactory |
| Example 4 | S/20 | C4 | Inner surface only | 0.6 | 90 | 60 | Satisfactory | Excellent | Excellent | Satisfactory | Excellent |
| Example 5 | S/20 | C5 | Inner surface only | 0.6 | 95 | 65 | Satisfactory | Excellent | Excellent | Satisfactory | Excellent |
| Example 6 | S/20 | C6 | Inner surface only | 0.6 | 99 | 69 | Satisfactory | Excellent | Excellent | Satisfactory | Excellent |
| Example 7 | S/20 | C7 | Inner surface only | 0.6 | 105 | 70 | Satisfactory | Excellent | Excellent | Satisfactory | Excellent |
| Example 8 | S/20 | C8 | Inner surface only | 0.6 | 91 | 67 | Satisfactory | Excellent | Excellent | Excellent | Excellent |
| Example 9 | S/20 | D1 | Inner surface only | 0.6 | 85 | 55 | Satisfactory | Excellent | Excellent | Satisfactory | Excellent |
| Example 10 | S/20 | D2 | Inner surface only | 0.6 | 85 | 62 | Satisfactory | Excellent | Excellent | Satisfactory | Excellent |
| Example 11 | S/20 | D3 | Inner surface only | 0.6 | 87 | 63 | Satisfactory | Excellent | Excellent | Satisfactory | Excellent |
| Example 12 | S/20 | E1 | Inner surface only | 0.6 | 89 | 64 | Satisfactory | Facallent | Excellent | Satisfactory | Excellent |
| Example 13 | S/20 | E2 | Inner surface only | 0.6 | 92 | 65 | Satisfactory | Excellent | Excellent | Excellent | Excellent |
| Example 14 | S/20 | E3 | Inner surface only | 0.6 | 91 | 65 | Satisfactory | Excellent | Excellent | Excellent | Excellent |
| Example 15 | S/20 | F1 | Inner surface only | 0.6 | 89 | 63 | Satisfactory | Excellent | Excellent | Satisfactory | Excellent |
| Example 16 | S/20 | F2 | Inner surface only | 0.6 | 90 | 64 | Satisfactory | Excellent | Excellent | Satisfactory | Excellent |
| Example 17 | S/20 | G1 | Inner surface only | 0.6 | 95 | 67 | Satisfactory | Excellent | Excellent | Satisfactory | Satisfactory |
| Example 18 | S/20 | H1 | Inner surface only | 0.6 | 93 | 66 | Satisfactory | Excellent | Excellent | Satisfactory | Satisfactory |
| Example 19 | S/20 | I1 | Inner surface only | 0.6 | 92 | 66 | Satisfactory | Excellent | Excellent | Satisfactory | Satisfactory |
| Example 20 | 20/20 | A4 | Inner surface only | 0.4 | 90 | 69 | Satisfactory | Excellent | Satisfactory | Excellent | Satisfactory |
| Example 21 | 20/20 | B2 | Inner surface only | 0.4 | 99 | 70 | Satisfactory | Excellent | Satisfactory | Satisfactory | Satisfactory |
| Example 22 | 20/20 | C3 | Inner surface only | 0.4 | 70 | 30 | Satisfactory | Excellent | Satisfactory | Satisfactory | Satisfactory |
| Example 23 | 20/20 | C4 | Inner surface only | 0.4 | 90 | 60 | Satisfactory | Excellent | Satisfactory | Satisfactory | Excellent |
| Example 24 | 20/20 | C5 | Inner surface only | 0.4 | 95 | 65 | Satisfactory | Excellent | Satisfactory | Satisfactory | Excellent |
| Example 25 | 20/20 | C6 | Inner surface only | 0.4 | 99 | 69 | Satisfactory | Excellent | Satisfactory | Satisfactory | Excellent |
| Example 26 | 20/20 | C7 | Inner surface only | 0.4 | 105 | 70 | Satisfactory | Excellent | Satisfactory | Satisfactory | Excellent |
| Example 27 | 20/20 | C8 | Inner surface only | 0.4 | 91 | 67 | Satisfactory | Excellent | Satisfactory | Excellent | Excellent |
| Example 28 | 20/20 | D1 | Inner surface only | 0.4 | 85 | 55 | Satisfactory | Excellent | Satisfactory | Satisfactory | Excellent |
| Example 29 | 20/20 | D2 | Inner surface only | 0.4 | 85 | 62 | Satisfactory | Excellent | Satisfactory | Satisfactory | Excellent |
| Example 30 | 20/20 | D3 | Inner surface only | 0.4 | 87 | 63 | Satisfactory | Excellent | Satisfactory | Satisfactory | Excellent |
| Example 31 | 20/20 | E1 | Inner surface only | 0.4 | 89 | 64 | Satisfactory | Excellent | Satisfactory | Satisfactory | Excellent |
| Example 32 | 20/20 | E2 | Inner surface only | 0.4 | 92 | 65 | Satisfactory | Excellent | Satisfactory | Excellent | Excellent |
| Example 33 | 20/20 | E3 | Inner surface only | 0.4 | 91 | 65 | Satisfactory | Excellent | Satisfactory | Excellent | Excellent |

TABLE 7

| | Original sheet | Coating film No | Coating film formed surface | Amount of coating film [g/m$^2$] | Contact angle on inner surface Water | Contact angle on inner surface n-hexadecane | Performance Primary rust resistance | Coating property | Coating property after storage | Work-ability | Corrosion resistance |
|---|---|---|---|---|---|---|---|---|---|---|---|
| Example 34 | 20/20 | F1 | Inner surface only | 0.4 | 89 | 63 | Satisfactory | Excellent | Satisfactory | Satisfactory | Excellent |
| Example 35 | 20/20 | F2 | Inner surface only | 0.4 | 90 | 64 | Satisfactory | Excellent | Satisfactory | Satisfactory | Excellent |
| Example 36 | 20/20 | G1 | Inner surface only | 0.4 | 95 | 67 | Satisfactory | Excellent | Satisfactory | Satisfactory | Satisfactory |
| Example 37 | 20/20 | H1 | Inner surface only | 0.4 | 93 | 66 | Satisfactory | Excellent | Satisfactory | Satisfactory | Satisfactory |
| Example 38 | 20/20 | I1 | Inner surface only | 0.4 | 92 | 66 | Satisfactory | Excellent | Satisfactory | Satisfactory | Satisfactory |
| Example 39 | S/5 | C5 | Inner surface only | 0.6 | 95 | 65 | Satisfactory | Excellent | Excellent | Satisfactory | Satisfactory |
| Example 40 | S/5 | D2 | Inner surface only | 0.6 | 85 | 62 | Satisfactory | Excellent | Excellent | Satisfactory | Satisfactory |
| Example 41 | S/5 | E1 | Inner surface only | 0.6 | 89 | 64 | Satisfactory | Excellent | Excellent | Satisfactory | Satisfactory |
| Example 42 | S/5 | F1 | Inner surface only | 0.6 | 89 | 63 | Satisfactory | Excellent | Excellent | Satisfactory | Satisfactory |
| Example 43 | S/15 | C5 | Inner surface only | 0.6 | 95 | 65 | Satisfactory | Excellent | Excellent | Satisfactory | Excellent |
| Example 44 | S/15 | D2 | Inner surface only | 0.6 | 85 | 62 | Satisfactory | Excellent | Excellent | Satisfactory | Excellent |
| Example 45 | S/15 | E1 | Inner surface only | 0.6 | 89 | 64 | Satisfactory | Excellent | Excellent | Satisfactory | Excellent |
| Example 46 | S/15 | F1 | Inner surface only | 0.6 | 89 | 63 | Satisfactory | Excellent | Excellent | Satisfactory | Excellent |
| Example 47 | S/30 | C5 | Inner surface only | 0.6 | 95 | 65 | Satisfactory | Excellent | Excellent | Satisfactory | Excellent |
| Example 48 | S/30 | D2 | Inner surface only | 0.6 | 85 | 62 | Satisfactory | Excellent | Excellent | Satisfactory | Excellent |
| Example 49 | S/30 | E1 | Inner surface only | 0.6 | 89 | 64 | Satisfactory | Excellent | Excellent | Satisfactory | Excellent |
| Example 50 | S/30 | F1 | Inner surface only | 0.6 | 89 | 63 | Satisfactory | Excellent | Excellent | Satisfactory | Excellent |
| Example 51 | S/40 | C5 | Inner surface only | 0.6 | 95 | 65 | Satisfactory | Excellent | Excellent | Satisfactory | Excellent |
| Example 52 | S/40 | D2 | Inner surface only | 0.6 | 85 | 62 | Satisfactory | Excellent | Excellent | Satisfactory | Excellent |
| Example 53 | S/40 | E1 | Inner surface only | 0.6 | 89 | 64 | Satisfactory | Excellent | Excellent | Satisfactory | Excellent |
| Example 54 | S/40 | F1 | Inner surface only | 0.6 | 89 | 63 | Satisfactory | Excellent | Excellent | Satisfactory | Excellent |
| Example 55 | S/20 | C5 | Inner surface only | 0.1 | 90 | 61 | Satisfactory | Excellent | Excellent | Satisfactory | Satisfactory |
| Example 56 | S/20 | C5 | Inner surface only | 0.3 | 95 | 65 | Satisfactory | Excellent | Excellent | Satisfactory | Excellent |
| Example 57 | S/20 | C5 | Inner surface only | 0.8 | 95 | 65 | Satisfactory | Excellent | Excellent | Satisfactory | Excellent |
| Example 58 | S/20 | C5 | Inner surface only | 1.2 | 95 | 65 | Satisfactory | Excellent | Excellent | Satisfactory | Excellent |
| Example 59 | S/20 | C5 | Inner surface only | 1.5 | 95 | 65 | Satisfactory | Excellent | Excellent | Satisfactory | Excellent |
| Example 60 | S/20 | C5 | Inner surface only | 2 | 95 | 65 | Satisfactory | Excellent | Excellent | Satisfactory | Excellent |
| Example 61 | S/20 | D2 | tuner only | 0.3 | 85 | 62 | Satisfactory | Excellent | Excellent | Satisfactory | Excellent |
| Example 62 | S/20 | D2 | Inner surface only | 1.2 | 85 | 62 | Satisfactory | Excellent | Excellent | Satisfactory | Excellent |
| Example 63 | S/20 | E1 | Inner surface only | 0.3 | 89 | 64 | Satisfactory | Excellent | Excellent | Satisfactory | Excellent |
| Example 64 | S/20 | E1 | Inner surface only | 1.2 | 89 | 64 | Satisfactory | Excellent | Excellent | Satisfactory | Excellent |
| Example 65 | S/20 | F1 | Inner surface only | 0.3 | 89 | 63 | Satisfactory | Excellent | Excellent | Satisfactory | Excellent |
| Example 66 | S/20 | F1 | Inner surface only | 1.2 | 89 | 63 | Satisfactory | Excellent | Excellent | Satisfactory | Excellent |
| Example 67 | S/EG40 | F1 | Inner surface only | 0.3 | 89 | 63 | Satisfactory | Excellent | Excellent | Satisfactory | Satisfactory |
| Example 68 | S/EG40 | F1 | Inner surface only | 1.2 | 89 | 63 | Satisfactory | Excellent | Excellent | Satisfactory | Satisfactory |

TABLE 8

| | Original sheet | Coating film No | Coating film formed surface | Amount of coating film [g/m²] | Contact angle on inner surface Water | Contact angle on inner surface n-hexadecane | Performance Primary rust resistance | Coating property | Coating property after storage | Workability | Corrosion resistance |
|---|---|---|---|---|---|---|---|---|---|---|---|
| Comparative Example 1 | S/20 | A1 | Inner surface only | 0.6 | 50 | 10 | Satisfactory | Excellent | Excellent | Excellent | Poor |
| Comparative Example 2 | S/20 | A2 | Inner surface only | 0.6 | 65 | 12 | Satisfactory | Excellent | Excellent | Excellent | Unsatisfactory |
| Comparative Example 3 | S/20 | A3 | Inner surface only | 0.6 | 70 | 15 | Satisfactory | Excellent | Excellent | Excellent | Unsatisfactory |
| Comparative Example 4 | S/20 | B1 | Inner surface only | 0.6 | 75 | 25 | Satisfactory | Excellent | Excellent | Excellent | Unsatisfactory |
| Comparative Example 5 | S/20 | B3 | Inner surface only | 0.6 | 108 | 75 | Poor | Excellent | Poor | Unsatisfactory | Satisfactory |
| Comparative Example 6 | S/20 | B4 | Inner surface only | 0.6 | 115 | 80 | Poor | Excellent | Poor | Poor | Unsatisfactory |
| Comparative Example 7 | S/20 | C1 | Inner surface only | 0.6 | 50 | 0 | Satisfactory | Excellent | Excellent | Excellent | Poor |
| Comparative Example 8 | S/20 | C2 | Inner surface only | 0.6 | 40 | 25 | Satisfactory | Excellent | Excellent | Satisfactory | Poor |
| Comparative Example 9 | 20/20 | A1 | Inner surface only | 0.4 | 50 | 10 | Satisfactory | Excellent | Excellent | Excellent | Poor |
| Comparative Example 10 | 20/20 | A2 | Inner surface only | 0.4 | 65 | 12 | Satisfactory | Excellent | Excellent | Excellent | Unsatisfactory |
| Comparative Example 11 | 20/20 | A3 | Inner surface only | 0.4 | 70 | 15 | Satisfactory | Excellent | Excellent | Excellent | Unsatisfactory |
| Comparative Example 12 | 20/20 | B1 | Inner surface only | 0.4 | 75 | 25 | Satisfactory | Excellent | Excellent | Excellent | Unsatisfactory |
| Comparative Example 13 | 20/20 | B3 | Inner surface only | 0.4 | 108 | 75 | Unsatisfactory | Excellent | Poor | Poor | Satisfactory |
| Comparative Example 14 | 20/20 | B4 | Inner surface only | 0.4 | 115 | 80 | Unsatisfactory | Excellent | Poor | Poor | Unsatisfactory |
| Comparative Example 15 | 20/20 | C1 | Inner surface only | 0.4 | 50 | 0 | Satisfactory | Excellent | Excellent | Excellent | Poor |
| Comparative Example 16 | 20/20 | C2 | Inner surface only | 0.4 | 40 | 25 | Satisfactory | Excellent | Excellent | Satisfactory | Poor |
| Comparative Example 17 | 20/20 | A1 | Both surfaces | 0.6 | 50 | 10 | Satisfactory | Poor | Poor | Excellent | Poor |
| Comparative Example 18 | 20/20 | B2 | Both surfaces | 0.6 | 99 | 70 | Satisfactory | Poor | Poor | Poor | Poor |
| Comparative Example 19 | 20/20 | B3 | Both surfaces | 0.6 | 108 | 75 | Satisfactory | Poor | Poor | Poor | Poor |
| Comparative Example 20 | 20/20 | C2 | Both surfaces | 0.6 | 40 | 25 | Satisfactory | Poor | Poor | Satisfactory | Poor |
| Comparative Example 21 | 20/20 | C3 | Both surfaces | 0.6 | 70 | 30 | Satisfactory | Poor | Poor | Unsatisfactory | Unsatisfactory |
| Comparative Example 22 | 20/20 | C4 | Both surfaces | 0.6 | 90 | 60 | Satisfactory | Poor | Poor | Poor | Unsatisfactory |
| Comparative Example 23 | S/S | C5 | Inner surface only | 1 | 93 | 63 | Satisfactory | Excellent | Excellent | Satisfactory | Poor |
| Comparative Example 24 | EG | C5 | Inner surface only | 0.6 | 94 | 64 | Satisfactory | Excellent | Unsatisfactory | Poor | Poor |

As shown in the results in Tables 6 to 8, Examples according to the present invention showed evaluations of "Satisfactory" or higher in every evaluation item, and had satisfactory characteristics. To be specific, regarding the primary rust resistance, rust occurred in Comparative Examples 5, 6, 13, and 14 in which the n-hexadecane contact angles exceeded the upper limit of the present invention. Further, regarding the coating property, Examples and Comparative Examples other than Comparative Examples 17 to 22, each of which had the chemical conversion coating layer formed on the surface to be the outer surface, showed satisfactory evaluations of "Excellent", however, regarding the coating property after storage, evaluation results remarkably deteriorated in each of Comparative Examples 5, 6, 13, and 14 in which rust occurred in the primary rust. In addition, as shown in Table 9, regarding the coating property after storage, slight unevenness of an acceptable level occurred in each of Examples 20 to 38 in which the Zn—Ni alloy plated layer was also provided on the surface to be the outer surface. Therefore, it was found that it is more preferred that the steel sheet according to the present invention have a non-plated outer surface. Note that, although each of Comparative Examples 9 to 12, 15, and 16 had the Zn—Ni alloy plated layer on the surface to be the outer surface, the coating property after storage was "Excellent", since the n-hexadecane contact angle on the inner surface was less than the lower limit according to the present invention. However, because the n-hexadecane contact angle on the inner surface was less than the lower limit according to the present invention, the corrosion resistance deteriorated. Regarding the workability (slidability), the workability remarkably deteriorated in each of Comparative Examples 5, 6, 13, and 14 in which the n-hexadecane contact angle exceeded the upper limit of the present invention and in each of Comparative Examples 18, 19, 21, and 22 in which, although the n-hexadecane contact angle was within the range of the present invention, the chemical conversion coating layers were formed on both inner and outer surfaces. Moreover, comparing Examples according to the present invention with each other, evaluations were more satisfactory in each of Examples 1, 8, 13, 14, 20, 27, 32, and 33 to which polyolefin wax was added. Regarding the corrosion resistance with respect to deteriorated gasoline, Examples according to the present invention showed satisfactory evaluations, and in particular, Examples 3 to 16, 22 to 35, and 43 to 66, each of which used, as the chromate-free chemical conversion coating layer, an inorganic coating film not containing an organic resin component other than polyolefin wax and a fluorine-based resin, showed more preferable evaluations. Further, it was found that Examples 4 to 16, 23 to 35, and 43 to 66, each of which had the n-hexadecane contact angle of more than or equal to 55 degrees, showed more preferable evaluations. Still further, referring to Examples 55 to 60, in the case where the deposition amount of the chemical conversion coating layer was more than or equal to 0.3 g/m$^2$, it was found that the corrosion resistance was more preferable. In addition, referring to Examples 39 to 42, in the case where the deposition amount of the Zn—Ni alloy plated layer per surface is more than or equal to 15 g/m$^2$, it was found that the corrosion resistance was more preferable.

For the one-surface-plated materials of the original sheets shown in Table 1, the non-plated surface sides were each analyzed in detail, and approximately 0.1 g/m$^2$ of Zn and Ni was detected. In the results shown in Table 9, for confirming a slight amount of Zn and Ni on the non-plated surface side, the original sheets of S/20 and S/EG40 shown in Table 1 were used, each of the plated surface sides was sealed with a tape, then each of the non-plated surface sides was polished using abrasive paper of #800, and after that, anode electrolytic treatment was performed to completely remove the slight amount of Zn and Ni (*1: Examples 69 and 71). Alternatively, S/20 and S/EG40 were used, each of the plated surface sides was sealed with a tape, and then electroplating of a predetermined amount of Zn or Ni was performed on each of the non-plated surface sides (*2: Examples 70, 72, and 74 to 77). After that, in the same manner as the preceding examples, predetermined coating treatment was performed to prepare samples of Examples 69 to 77. Those samples and, among the samples shown in Tables 6 to 8, Example 5, Example 24, Example 58, Example 59, and Comparative Example 22 were selected, and measurement of the contact angles on the outer surfaces, evaluation of the coating properties, and evaluation of the coating properties after storage were performed. The method of evaluating those samples and the criteria for the evaluations are the same as those shown above.

For those samples, seam weldability evaluation was performed. The surfaces to be the inner surfaces were placed together. The seam welding conditions are as follows.

TABLE 9

| | Original sheet | Coating film No | Coating film formed surface | Amount of coating film [g/m$^2$] | Deposition amount on outer surface [g/m$^2$] Zn | Deposition amount on outer surface [g/m$^2$] Ni | Contact angle on outer surface n-hexadecane | Coating property | Coating property after storage | Appropriate welding range |
|---|---|---|---|---|---|---|---|---|---|---|
| Example 5 | S/20 | C5 | Inner surface only | 0.6 | 0.05 | 0.1 | Less than 5 | Excellent | Excellent | 3.7 kA |
| Example 24 | 20/20 | C5 | Inner surface only | 0.4 | 17.9 | 2.1 | Less than 5 | Excellent | Satisfactory | 3.0 kA |
| Example 58 | S/20 | C5 | Inner surface only | 1.2 | 0.05 | 0.1 | Less than 5 | Excellent | Excellent | 3.6 kA |
| Example 59 | S/20 | C5 | Inner surface only | 1.5 | 0.05 | 0.1 | Less than 5 | Excellent | Excellent | 3.0 kA |
| Example 67 | S/EG40 | F1 | Inner surface only | 0.3 | 0.2 | 0 | Less than 5 | Excellent | Excellent | 3.0 kA |
| Example 69 | S/20*1 | C5 | Inner surface only | 0.6 | 0.0 | 0.0 | 10 | Satisfactory | Satisfactory | 3.7 kA |
| Example 70 | S/20*2 | C5 | Inner surface only | 0.6 | 1.05 | 0.1 | Less than 5 | Satisfactory | Satisfactory | 3.5 kA |
| Example 71 | S/EG40*1 | F1 | Inner surface only | 0.3 | 0 | 0 | 10 | Satisfactory | Satisfactory | 3.0 kA |
| Example 72 | S/EG40*2 | F1 | Inner surface only | 0.3 | 1.2 | 0 | Less than 5 | Satisfactory | Satisfactory | 3.0 kA |
| Example 73 | S/EG40*2 | C5 | Inner surface only | 0.3 | 0 | 0.01 | Less than 5 | Excellent | Excellent | 3.7 kA |
| Example 74 | S/EG40*2 | F1 | Inner surface only | 0.3 | 1.0 | 0 | Less than 5 | Satisfactory | Satisfactory | 3.7 kA |
| Example 75 | S/EG40*2 | F1 | Inner surface only | 0.3 | 0.3 | 0 | Less than 5 | Excellent | Excellent | 3.7 kA |
| Example 76 | S/EG40*2 | F1 | Inner surface only | 0.3 | 0.0 | 0.1 | Less than 5 | Excellent | Excellent | 3.7 kA |
| Example 77 | S/EG40*2 | F1 | Inner surface only | 0.3 | 0.0 | 0.5 | Less than 5 | Excellent | Excellent | 3.7 kA |
| Comparative Example 22 | 20/20 | C4 | Both surfaces | 0.6 | 17.9 | 2.1 | 60 | Poor | Poor | 2.5 kA |

*1A slight amount of deposition on the outer surface was completely removed.
*2Zn or Ni was additionally plated on the outer surface.

Electrode: a disc-shaped electrode made of a Cu—Cr alloy, in which a cross section at a central part had a radius of 15 mm and a width of 4.5 mm and a cross section at an end part had a radius of 4 mm and a width of 8 mm Welding method: piling of two sheets, lap seam welding Welding pressure: 400 kgf (note that 1 kgf is approximately 9.8 N)

Welding time: 2/50 sec on, 1/50 sec off

Cooling: inner part water cooled, and outer part water cooled

Welding speed: 2.5 m/min

A range of current in which an appropriate nugget can be obtained was determined by changing the welding current.

Table 10 shows the results. In the lap seam welding, it is considered to be practically acceptable as long as the appropriate current range is more than or equal to approximately 3 kA, and it is preferred that the range be wider. Accordingly, comparing Examples 5 and 24 with each other, it was found that one-surface plating was more preferable than the both-surfaces plating. Further, comparing Examples 5, 58, and 59 with each other, it was found that the upper limit of the coating amount of the chemical conversion coating layer was preferably approximately 1.2 g/m$^2$.

TABLE 10

|  | Appropriate welding range |
| --- | --- |
| Example 5 | More than or equal to 3.7 kA |
| Example 24 | More than or equal to 3.0 kA |
| Example 58 | More than or equal to 3.6 kA |
| Example 59 | More than or equal to 3.0 kA |
| Comparative Example 22 | More than or equal to 2.5 kA |

The preferred examples of the present invention have been described above, whilst the present invention is not limited to the above examples. A person skilled in the art may find various alterations and modifications within the scope of the appended claims, and it should be understood that they will naturally come under the technical scope of the present invention.

INDUSTRIAL APPLICABILITY

The present invention is industrially useful, because the present invention can provide the surface treated steel sheet for a fuel tank, which exhibits excellent corrosion resistance under an environment in which various fuels are enclosed, the fuels including a fuel containing an organic acid such as deteriorated gasoline and a fuel containing dew condensation water in addition to an organic acid, and which has satisfactory press workability.

Moreover, the present invention provides the steel sheet having different surface states between the inner and outer surfaces, by making the surface to be the outer surface of the fuel tank to be base metal and making the surface to be the inner surface of the fuel tank to be the chromate-free chemical conversion coating film. Such a steel sheet according to the present invention has every performance necessary from the production of the fuel tank to the using of the fuel tank: (i) excellent workability that is necessary during processing and welding of the steel sheet to make the steel sheet into a tank shape; (ii) excellent coating property that is necessary during coating of the processed tank to enhance the visual quality of the external appearance; and (iii) excellent corrosion resistance that is necessary for using the produced tank for a long time. The steel sheet according to the present invention also has an effect that is not conventionally achieved in the point that the surface states that are different between the inner and outer surfaces interact with each other and differences in performances between the inner and outer surfaces can be further exhibited.

The invention claimed is:

1. A surface treated steel sheet for a fuel tank, the surface treated steel sheet comprising:
   a Zn or Zn—Ni alloy plated layer which is placed on a surface to be an inner surface of the fuel tank, or on the surface to be the inner surface of the fuel tank and a surface to be an outer surface of the fuel tank; and
   a chromate-free chemical conversion coating layer containing a water-and-oil repellent, the chromate free chemical conversion coating layer being placed over the Zn or Zn—Ni alloy plated layer,
   wherein a water contact angle on a surface of the chromate-free chemical conversion coating layer is more than or equal to 70 degrees and less than or equal to 95 degrees and an n-hexadecane contact angle on the surface of the chromate-free chemical conversion coating layer is more than or equal to 30 degrees and less than or equal to 70 degrees.

2. The surface treated steel sheet for a fuel tank according to claim 1, wherein a deposition amount of Zn and/or Ni on the surface to be the outer surface of the fuel tank, is 0.01 to 0.5 g/m$^2$.

3. The surface treated steel sheet for a fuel tank according to claim 1, wherein a deposition amount of the Zn or Zn—Ni alloy plated layer is at most 40 g/m$^2$ per surface.

4. The surface treated steel sheet for a fuel tank according to claim 1, wherein the surface treated steel sheet comprises the Zn—Ni alloy plated layer, wherein said Zn—Ni alloy plated layer is placed on the surface to be the inner surface of the fuel tank, and wherein a Ni content in the Zn—Ni alloy plated layer is 9 to 14 mass % with respect to a total mass of the Zn—Ni alloy plated layer.

5. The surface treated steel sheet for a fuel tank according to claim 1, wherein a deposition amount of the chromate-free chemical conversion coating layer is 0.1 to 2 g/m$^2$.

6. The surface treated steel sheet for a fuel tank according to claim 1, wherein the chromate-free chemical conversion coating layer contains, as the water-and-oil repellent, a fluorine-based water-and-oil repellent.

7. The surface treated steel sheet for a fuel tank according to any one of claims 1, 2, 3, 4, 5, 6, wherein the chromate-free chemical conversion coating layer further contains a polyolefin lubricant.

8. The surface treated steel sheet for a fuel tank according to claim 1, wherein
   the chromate-free chemical conversion coating layer is an inorganic coating film, and does not contain an organic resin component other than the water-and-oil repellent.

9. The surface treated steel sheet for a fuel tank according to claim 7, wherein the chromate-free chemical conversion coating layer is an inorganic coating film, and does not contain an organic resin component other than the water-and-oil repellent and the polyolefin lubricant.

10. The surface treated steel sheet for a fuel tank according to claim 2,
    wherein an n-hexadecane contact angle on the surface to be the outer surface of the fuel tank is less than 10 degrees.

11. The surface treated steel sheet for a fuel tank according to claim 1, wherein
    the surface to be the inner surface of the fuel tank is provided with the chromate-free chemical conversion coating layer, wherein a deposition amount of the Zn or Zn—Ni alloy plated layer is at least 5 g/m$^2$, and the surface to be the outer surface of the fuel tank is not provided with the chromate-free chemical conversion coating layer.

\* \* \* \* \*